(12) United States Patent
Barwich et al.

(10) Patent No.: US 8,470,122 B2
(45) Date of Patent: Jun. 25, 2013

(54) METHOD FOR THE PRODUCTION OF AN ABRASION-RESISTANT FILM AND FINISH FILM PRODUCED ACCORDING TO SAID METHOD

(75) Inventors: Stefan Barwich, Rheda-Wiedenbrueck (DE); Guido Schweizer, Merklingen (DE)

(73) Assignee: Dakor Melamin Impraegnierungen, GmbH, Heroldstatt (DE)

( * ) Notice: Subject to any disclaimer, the term of this patent is extended or adjusted under 35 U.S.C. 154(b) by 391 days.

(21) Appl. No.: 12/681,418

(22) PCT Filed: Jun. 9, 2008

(86) PCT No.: PCT/EP2008/057144
§ 371 (c)(1),
(2), (4) Date: Jun. 24, 2010

(87) PCT Pub. No.: WO2009/043611
PCT Pub. Date: Apr. 9, 2009

(65) Prior Publication Data
US 2010/0291372 A1 Nov. 18, 2010

(30) Foreign Application Priority Data

Oct. 4, 2007 (DE) .................. 10 2007 047 636
Nov. 19, 2007 (EP) .................... 07121006

(51) Int. Cl.
*C09J 9/02* (2006.01)
*C04B 37/00* (2006.01)
*B32B 5/16* (2006.01)

(52) U.S. Cl.
USPC .............. 156/325; 156/307.3; 156/307.5; 428/323

(58) Field of Classification Search
USPC .............. 156/307.3, 307.5, 325; 428/323
See application file for complete search history.

(56) References Cited

U.S. PATENT DOCUMENTS

| | | | | |
|---|---|---|---|---|
| 4,473,613 A | * | 9/1984 | Jaisle et al. | ............. 428/220 |
| 6,231,670 B1 | * | 5/2001 | Fischer et al. | ............. 118/67 |
| 6,663,952 B1 | | 12/2003 | Mehnert et al. | |
| 6,835,421 B1 | | 12/2004 | Döhring | |
| 7,919,144 B2 | | 4/2011 | Haller | |
| 2006/0182986 A1 | * | 8/2006 | Ackner et al. | ............. 428/521 |

FOREIGN PATENT DOCUMENTS

| | | | |
|---|---|---|---|
| DE | 19846659 | | 4/2000 |
| DE | 102004034790 | | 2/2005 |
| DE | 102004043355 | | 3/2006 |
| EP | 1801175 | | 6/2007 |
| WO | WO0044984 | | 8/2000 |
| WO | WO2006/013469 | * | 2/2006 |

* cited by examiner

Primary Examiner — Michael Orlando
(74) Attorney, Agent, or Firm — Deborah A. Basile; Karen K. Chadwell

(57) ABSTRACT

A method for the production of an abrasion-resistant film (7, 9), in particular for the production of laminate floor materials or abrasion-resistant furniture surfaces, comprising the following method stages: a first application stage (AI) in which a decorative paper (1) is provided with an impregnation (2) containing a first synthetic resin, a second application stage (AII) in which a layer (4$_{wet}$) which contains a second synthetic resin and particulate abrasion-reducing material is applied to the moist impregnate (3$_{wet}$), a first treatment stage (BI) in which a heat treatment for partial curing of synthetic resins and for partial removal of the moisture from the moist coated impregnate (5$_{wet}$) is effected, a third application stage (AIII) in which the application of a cover layer (6$_{wet}$) containing a third synthetic resin is effected, and a final second treatment stage (BII) in which a heat treatment for removing the moisture is effected.

30 Claims, 2 Drawing Sheets

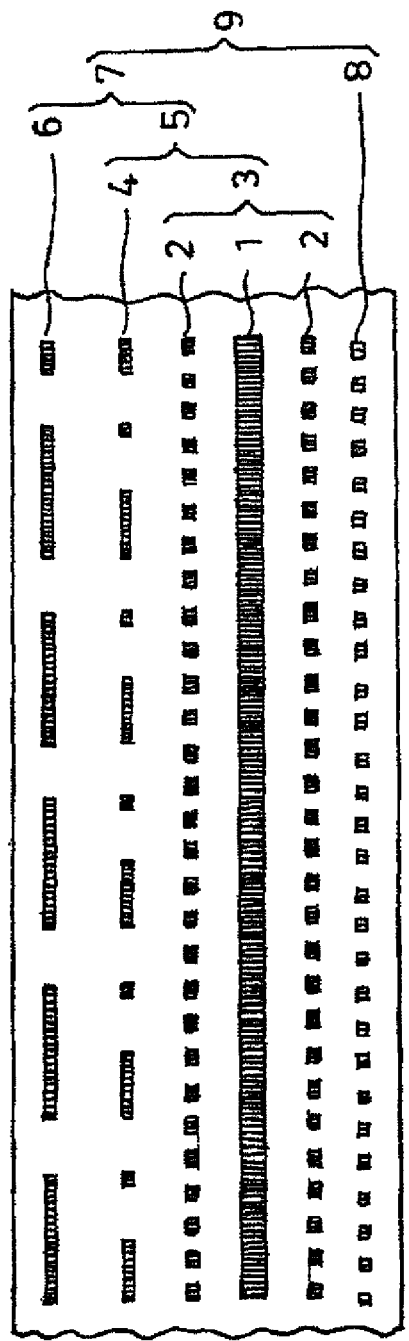

METHOD FOR THE PRODUCTION OF AN ABRASION-RESISTANT FILM AND FINISH FILM PRODUCED ACCORDING TO SAID METHOD

CROSS-REFERENCE TO RELATED APPLICATIONS

This application is a 35 U.S.C. §371 filing of International Application No. PCT/EP2008/057144 filed on Jun. 9, 2008, which claims priority to EP 07121006.6 filed on Nov. 19, 2007 and to DE 10 2007 047 636.3 filed on Oct. 4, 2007.

BACKGROUND OF THE INVENTION

1. Field of the Invention

The present invention relates to a method for the production of an abrasion-resistant film, in particular for the production of laminate floor materials or abrasion-resistant furniture surfaces, comprising the following steps of the method:
- a first application stage in which a decorative paper is provided with an impregnation containing a first synthetic resin,
- a second application stage in which a layer which contains a second synthetic resin and particulate abrasion-reducing material is applied to the moist impregnate,
- a first treatment stage in which a heat treatment for the partial curing of the synthetic resin and for the partial removal of the moisture from the moist coated impregnate is effected,
- a third application stage in which the application of a cover layer containing a third synthetic resin is effected, and
- a final second treatment stage in which a heat treatment for removing the moisture is effected.

Furthermore, the invention relates to an abrasion-resistant finish film, in particular for subsequent adhesive bonding with a carrier for the production of a laminate, consisting of a paper, in particular of a decorative paper, and of a cover layer deposited thereon and consisting of a cured synthetic resin.

2. Background of the Invention

European patent EP 1 068 394 B1 discloses a method for the production of an abrasion-resistant film, in particular for the production of laminate floor materials or abrasion-resistant furniture surfaces, in which, in a first application stage, a decorative paper is provided with an impregnation containing a first synthetic resin, in a second application stage a layer which contains a second synthetic resin and particulate abrasion-reducing material is applied to the moist impregnate, and then a heat treatment is effected which represents a treatment stage for the partial curing of the synthetic resin and for the partial removal of the moisture from the moist coated impregnate.

Said document relates in particular to a method for impregnating decorative papers used for the production of highly abrasion-resistant laminate floor materials, in which the decorative paper is first moistened with an amino resin and impregnated thereby, the amount of the resin being regulated by means of metering rolls, and a layer of amino resin in a special dispersion initially being sprayed onto the moistened wet decorative paper. The final mass per unit area—based on the dry mass of the base paper—is from 100% to 250% and the dispersion contains particulate abrasive material. As equipment for realizing the method, a standard impregnating channel from VITS, which has a slide-in module which in turn consists of an expander roller, a deflection roller, a nozzle orifice with collecting tray, a pair of metering rollers and wire-wound doctor rollers, is arranged after an impregnating unit. The use of such an apparatus is described, for example, in the technical article "New Method for ARP-Manufacturing" by E. Klas and W. Müller in Proceedings of the 2000 TAPPI Plastic Laminats Symposiums, pages 157-165, the abbreviation "ARP", which has recently been used by those skilled in the art also as an attribute for the nozzle used, representing "Abrasion Resistant Prepreg". Prepreg in turn is to be understood as meaning pretreated material which was impregnated and was subjected to predrying and partial curing in the sense of the heat treatment mentioned at the outset.

The product of the known method, a decorative paper comprising a uniform coating which has an amino resin with particulate silicon carbide, corundum or aluminum oxide and has no cellulose derivatives, can—as described in the patent—be pressed onto an HDF carrier board on a short-cycle press at 180° C. and with maintenance of a press time of 20 s. Such a board had an abrasion value of IP 12 000 in an abrasion test corresponding to the standard DIN EN 13329.

The abrasion test according to the standard DIN EN 13329 envisages that two friction wheels equipped with emery paper strips are used in a special test apparatus, in the holder of which the test specimens are clamped, where they are brought into contact with the friction wheels. After 100 revolutions in each case, the test specimens are checked for abrasion and the emery paper is replaced by fresh emery paper after 200 revolutions in each case. The test is continued until the so-called initial abrasion point (IP) is reached. This is understood as meaning the point at which, under the conditions defined in detail in the standard, the decorative print present in the test specimen is worn through for the first time in a clearly detectable manner. The number of revolutions required for reaching this point is recorded and is a measure of the abrasion resistance. The abrasion resistance of the laminate floor is then stated in abrasion classes according to the table below.

TABLE 1

Abrasion classification according to DIN EN 13329

| Abrasion class | Requirement (IP value) Number of revolutions | Application |
|---|---|---|
| AC1 | at least 900 | Bedroom |
| AC2 | at least 1500 | Living room |
| AC3 | at least 2000 | Lobby Small office |
| AC4 | at least 4000 | Hotel |
| AC5 | at least 6000 | Department store |

A similar classification is also to be found in the standard DIN EN 438 "High-pressure decorative laminates (HPL)—boards based on curable resins (laminates)—Part 2: Determination of the properties".

With regard to the processability of the known product in the press, the following should be noted: the heat treatment which is effected after the application of the additional amino resin layer with the particulate abrasion-reducing material is firstly a drying process in which the water present in the resin material used is removed and secondly is simultaneously a process in which the polymer formation, in particular by solution polycondensation, takes place. In this heat treatment, the technological parameters must be chosen in such a way that no complete crosslinking of the monomers takes place, so that the coated impregnate can be deformed and pressed while still under pressure and at elevated temperature.

In the case of phenol resins which, like the amino resins, in particular melamine-formaldehyde (MF) and melamine-urea-formaldehyde (MUF) resins, are obtained by polycondensation with the use of formaldehyde as one of the main reactants, resole, which is soluble in organic solvents and is processed as casting resin is first formed in the stepwise reaction. At elevated temperature, the resole gives resitol which can still be deformed and pressed under pressure and at elevated temperature, and then, through further condensation, the very hard, crosslinked, insulating material resite which is resistant to chemicals. In the preparation of the aminoplasts, no distinction is made between a resole, resitol and resite state, as in the case of the phenoplasts, but the aminoplasts, too, are first synthesized as oligomeric prepolymers which are crosslinked for final use. The degree of crosslinking which the resin must have in the end product in the process according to EP 1 068 394 B1 therefore corresponds to the resitol state of a phenoplast. In the article cited above, this state has been characterized by "B-stage".

According to EP 1 068 394 B1, for better processability on the press, flow auxiliaries, such as polyglycol ether, epsilon-caprolactam or butanediol, which are also intended to bring about a better distribution of the particulate material, are also used.

A known method of the type mentioned at the outset is described in DE 199 01 525 A1. This is a method for impregnating and coating paper which is intended for use as a cover layer of an abrasion-resistant laminate, comprising the following steps of the method:
 a) a continuous paper web is first impregnated with resin;
 b) the paper web is provided on one side with a coating material which contains a liquid resin and fine-particled abrasive material, in particular corundum;
 c) the coated paper web is dried;
 d) the coating is coated with a cover layer of liquid resin which is free of abrasive particles;
 e) the paper web is dried again.

The known method is intended to ensure that no excessively fast wear is caused on tools and machines by the coated product during subsequent hot pressing.

Both types of films—both those described in EP 1 068 394 B1 and those described in DE 199 01 525 A1—are intended for immediate further processing on a press.

However, apart from these films, which are the result of the known methods, so-called finish films are known which are supplied in roll form and which are subsequently bonded to suitable carriers not by means of a press but with the aid of an adhesive or glue.

In the case of these finish films, as described by way of example in DE 198 46 659 A1, which is considered as being of the generic type with regard to the product having the features at the outset, a particle-free layer consisting of a curable synthetic resin, such as an acrylate, or a layer containing at most nanoparticles, i.e. particles of the molecular order of magnitude—is found for increasing the scratch resistance of the surface, for the composition of which layer specific formulations and modifications which are polymerized by radiation curing with UV light are stated in DE 198 46 659 A1. The scratch resistance is determined on such a layer, in particular according to the standard DIN 53799.

BRIEF SUMMARY OF THE INVENTION

The object of the present invention is to provide a finish film of the type mentioned at the outset and a method of the type mentioned at the outset, by means of which a finish film of the type mentioned at the outset can be produced in a technologically less complicated manner, it being intended that the film meet the requirements of the standard DIN EN 13329 with regard to its performance characteristics. Furthermore the object of the present invention also comprises that it will be possible in the case of a finish film according to the invention to vary the abrasion resistance to achieve a desired value.

According to the invention, this is achieved with regard to the method according to the invention in that an acid-curing amino-formaldehyde resin, an isocyanate-crosslinking coating system or a mixture thereof is used as a second synthetic resin, which is applied to the moist impregnate in the second application stage, and in that complete curing of the synthetic resin is effected in the final second treatment stage.

The method according to the invention can advantageously be realized, as also described in detail below, in continuous operation in a single continuous plant as is known from the prior art—as described at the outset.

With regard to the finish film according to the invention, the problem on which the invention is based is solved if the paper is provided with an impregnation containing a first cured synthetic resin, if a layer which contains a second cured synthetic resin and particulate abrasion-reducing material is present on the impregnate under the cover layer, and if the cover layer consisting of a cured synthetic resin is formed from a third synthetic resin.

The finish film according to the invention can advantageously be produced by the method according to the invention, it being possible, in the second application stage, to adjust the proportion of the particulate abrasion-reducing material and/or the amount applied in the layer as a function of the abrasion resistance of the film which is to be achieved. As a result of the curing of the synthetic resins, the finish film according to the invention is ideal for further processing by adhesive bonding or lamination by means of a calender but no longer for processing on a hot press because, according to the method according to the invention, the amino resins preferably used as second and third synthetic resin, in particular melamine-formaldehyde precondensates etherified by methylation, may cure to give non-meltable network polymers at room temperature or moderately elevated temperature in the presence of acidic catalysts. The same also applies to an isocyanate-crosslinking coating system or a mixture of such a coating system with said amino resins. In the latter case, the mixture is then in particular a so-called three-component primer which is cured via two curing mechanisms and with two types of curing agents—preferably in the order of acid curing with subsequent isocyanate curing.

Further advantageous features appear in the subclaims and in the following description. The invention is explained in more detail with reference to working example illustrated by the attached drawings.

BRIEF DESCRIPTION OF THE DRAWINGS

FIG. 2 shows a schematic cross-sectional diagram of a preferred embodiment of a finish film according to the invention.

DETAILED DESCRIPTION OF THE INVENTION

Figure 1:
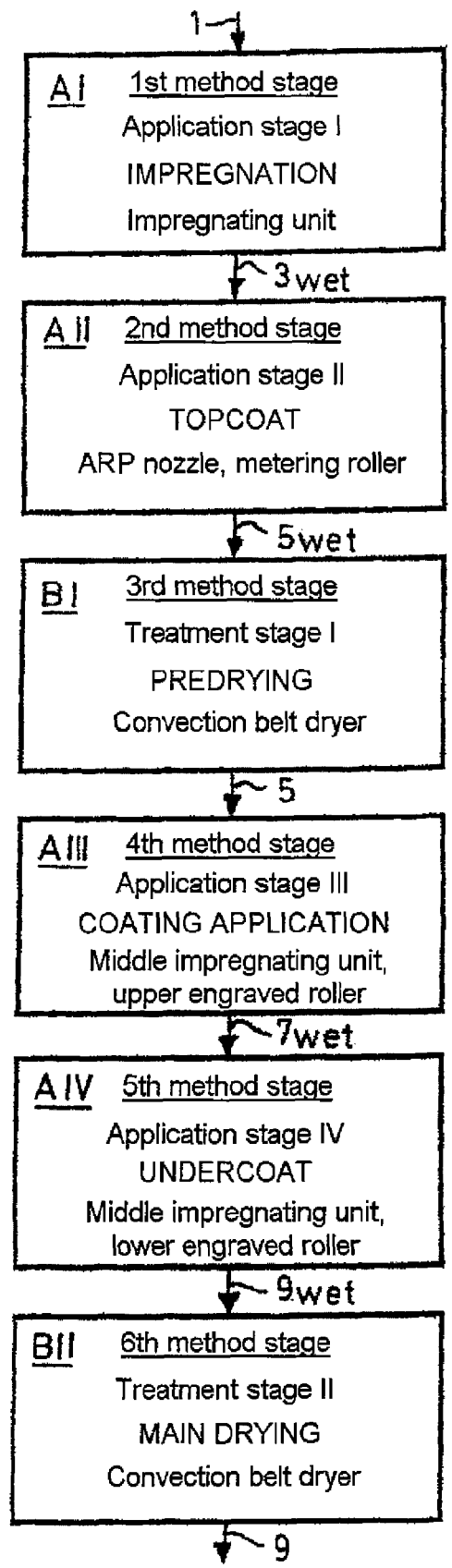
FIG. 1 shows a flow diagram of a preferred embodiment of a method according to the invention for the production of an abrasion-resistant film which can be used for the production of laminate materials, in particular of a finish film according to the invention.

The invention shall now be described in part with reference to the figures. In the two figures of the drawing, the same parts or parts corresponding to one another are always also provided with the same reference numerals, so that they are as a rule also described only once in each case. Regarding the method according to the invention (FIG. 1), after the individual steps of the method which are described, the applied layers are not yet in the same form as in the final finish film according to the invention (FIG. 2). In these cases where as a rule there is in each case still a very much higher moisture content in the layer than in the end product, the corresponding reference numerals in FIG. 1 each additionally contain the index "wet" in order to indicate the difference existing compared with the final product. The predried layers, which do not appear in the drawing, are however characterized in the following text in each case with the same reference numeral as the layers after the main drying and curing.

As is first evident from FIG. 1, the method according to the invention comprises, in its preferred embodiment, six method stages, of which the first method stage AI "impregnation", the second method stage AII "topcoat", the fourth method stage AIII "coat application" and the fifth method stage AIV "undercoat" are technological operations in which synthetic resins or mixtures thereof are applied in or on the paper 1 used as starting material, in particular a decorative paper 1, which may be printed or unprinted, and which are therefore referred to as application stages AI, AII, AIII, AIV. The fifth method stage (application stage IV) is to be regarded being optional. The third method stage BI and the sixth method stage BII are technological operations in which no synthetic resins or mixtures thereof are applied but these are modified chemically and physically, in particular by the action of heat, and which are therefore designated here as treatment stages BI, BII.

The flow diagram in FIG. 1 in conjunction with FIG. 2 illustrates that, in the method according to the invention for the production of an abrasion-resistant film 9, in particular of a finish film 9 according to the invention, which can be used for the production of laminate floor materials, in the first application stage AI a decorative paper 1 is provided with an impregnation $2_{wet}$ containing a first synthetic resin and not shown in detail. In a second application stage AII, a layer $4_{wet}$ which contains a second synthetic resin and particulate abrasion-reducing material is then applied to the moist impregnate $3_{wet}$. This is followed by a heat treatment which represents the first treatment stage BI for partial curing of the synthetic resins and for partial removal of the moisture from the moist coated impregnate $5_{wet}$.

In the third application stage AII, which follows the heat treatment as first treatment stage BI, a cover layer $6_{wet}$ (not shown separately in undried form) containing a third synthetic resin is then applied to the heat-treated product 5, in which the applied synthetic resins are present in an intermediately dried and partly crosslinked form. After the optionally present fourth application stage AIV, in which an undercoat $8_{wet}$ (likewise not shown separately in undried form) containing a fourth synthetic resin can additionally be applied, a further heat treatment of the still undried film $9_{wet}$ thus produced is effected for complete curing of the synthetic resins and—apart from a tolerable residual content—complete removal of the moisture. The film 9 with all its layers paper 1, impregnation 2, particle-containing layer 4, particle-free cover layer 6 and particle-free undercoat 8 is thus present in its final form shown in FIG. 2. The reference numeral 3 designates the impregnate comprising the paper 1 and the impregnation 2, reference numeral 5 designates the intermediate product present after the fourth method stage AIII and comprising the impregnate 3 and the particle-containing layer 4, and the reference numeral 7 designates the intermediate product which is present after application of the cover layer 6 from the intermediate product 5 present after the fourth method stage AIII. If the fifth method stage MV is omitted, this intermediate product 7 itself is the final finish film.

Regarding the method stages individually:

The first synthetic resin used in the first application stage AI may be an amino resin, which is in particular a urea-formaldehyde oligomer present in liquid form. Moreover, it can advantageously be envisaged that a polymer dispersion comprising one or more acrylate homopolymer(s) or methacrylate homopolymer(s), vinyl acetate homopolymer(s) and/or styrene-acrylate copolymer(s), styrene-methacrylate copolymer(s), polybutadiene-styrene copolymer(s), preferably in an amount of from 5 to 120 parts by mass, particularly preferably in an amount of from 60 to 100 parts by mass, based on 100 parts by mass of amino resin, is mixed with the amino resin before the impregnation. Such a polymer dispersion serves in particular for rendering the impregnating resin flexible.

Particularly preferably, an aqueous, anionic polymer dispersion of an acrylate-containing copolymer can be used as polymer dispersion, which is free of plasticizers and solvents and makes the treated impregnate $3_{wet}$ not only more flexible but also more highly adhesive for the further layer $4_{wet}$ to be applied in the next method stage AII, in particular the special melamine-containing layer $4_{wet}$ described below, which can be better applied thereby.

In addition, a curing agent for promoting the crosslinking, in particular ammonium or magnesium chloride, paratoluenesulfonic acid or—preferably—a chlorine-free curing agent based on an aqueous, substantially neutral solution of inorganic salts in the pH range from 6.8 to 7.4, and optionally a wetting agent can be mixed with the amino resin before the impregnation. Organic salts, too, can be used as curing agents. Particularly with the last-mentioned curing agents, the resin reactivity can advantageously be varied, with the result that—depending on requirements—different degrees of crosslinking and values of the curing and flexibility can be achieved.

In particular, an impregnating agent, preferably an anionic surfactant, such as diethylene glycol or a fatty alcohol glycol ether, can be mixed with the synthetic resin used in the first application stage AI, before the application. This brings about a reduction in the surface tension in the synthetic resin system, without resulting in significant development of foam. The time for the resin to penetrate into the pores of the paper is shortened thereby and the homogeneity of the impregnation is promoted. The proportion of the impregnating agent to the synthetic resin used in the first application stage AI can optimally be—based on the solids content of the first synthetic resin or synthetic resin mixture—in the range from about 0.1% by mass to 0.6% by mass, preferably from about 0.3% by mass to 0.5% by mass.

In the first application stage AI, the decorative paper 1 is first saturated with the impregnation $2_{wet}$ containing the first synthetic resin, in particular the synthetic resin being first washed onto the back of the decorative paper 1, the synthetic resin then penetrating into the decorative paper 1 without further application in the so-called breathing zone. Thereafter, the decorative paper 1 is loaded again with the first synthetic resin in an immersion zone. By means of this procedure, an optimally high degree of pore filling of the paper 1 and high uniformity of the impregnation $2_{wet}$ are achieved. As shown in FIG. 1, a customary impregnating unit can be used for realizing this method stage, the amount of the resin being regulated by means of metering rollers.

The amount applied for the impregnation $2_{wet}$ should be in the range from 10 to 80 g/m$^2$, preferably in the range from 15 to 35 g/m$^2$.

Advantageously, different alternatives are possible for the first synthetic resin described above for the first application stage AI.

Thus, a mixture of an aqueous dispersion of a polymer based on acrylate, styrene and melamine-formaldehyde resin can be used, it being possible to use a curing agent based on inorganic or organic salts and wetting agents. A high resistance to chemicals is achieved thereby in the end product.

A further alternative consists in the use of an aqueous dispersion of a polymer based on acrylate, styrene and melamine-formaldehyde resin and urea-formaldehyde resin, it being possible once again to use a curing agent based on inorganic or organic salts and wetting agents. By using the urea-formaldehyde resin, the production cost is reduced while preserving the product quality, since the starting material here is more economical than melamine-formaldehyde resin.

A third alternative consists in using mixtures of a modified, in particular unsaturated, polycarboxylic acid and a polyhydric alcohol as crosslinking component and/or an aqueous styrene-acrylate dispersion modified with such a polycarboxylic acid and a polyhydric alcohol as a crosslinking component. Typical of such mixtures is a solids content in the range from 45 to 55 percent, preferably of about 50 percent, a pH in the range from 2.5 to 4.5, preferably of 3.5, and a viscosity in the range from 200 to 1200 mPa·s (measured according to DIN EN ISO 53019). In the case of such mixtures, film formation advantageously begins even at room temperature. While they are still thermoplastically deformable prior to curing, they form, after curing, a stable composite whose properties can be adjusted from viscoplastic-thermosetting to hard-thermosetting. It is therefore possible in the various method stages to achieve a desired, in particular high, film flexibility which is advantageous in the coating process (method stage AIII or optionally method stage AIV) even when the finish film 7/9 is to be subsequently laminated with a carrier. Thus, the so-called postforming behavior is improved in the end product.

In addition, it is also possible to use mixtures of a modified polycarboxylic acid and a polyhydric alcohol as a crosslinking component and/or an aqueous styrene-acrylate dispersion modified with a polycarboxylic acid and a polyhydric alcohol as a crosslinking component and a mixture of urea-formaldehyde resin, here too it being possible to use curing agents based on inorganic or organic salts and wetting agents. The same advantages which were described for the third alternative are associated Therewith.

A fifth alternative envisages the use of mixtures of a modified polycarboxylic acid and a polyhydric alcohol as a crosslinking component and/or an aqueous styrene-acrylate dispersion, modified with a polycarboxylic acid and a polyhydric alcohol, as a crosslinking component and a mixture of melamine-formaldehyde resin—likewise with curing agents based on inorganic or organic salts and wetting agents. The use of this synthetic resin is an optimization solution with regard to the product properties of flexibility and resistance to chemicals. Depending on how high the proportion of the components provided specifically in the first alternative and in the third alternative alone is, that property profile of the finish film 7/9 can be shifted to a greater extent in the direction of higher resistance to chemicals with moderate flexibility or more in the direction of higher flexibility with moderate resistance to chemicals.

Furthermore, mixtures of a modified polycarboxylic acid and a polyhydric alcohol as a crosslinking component and/or of an aqueous styrene-acrylate dispersion, modified with a polycarboxylic acid and a polyhydric alcohol, as a crosslinking component and a mixture of urea-formaldehyde resin, melamine-formaldehyde resin, curing agent (as mentioned) and wetting agents can be used as first synthetic resin. The same production advantages which have already been mentioned for the second alternative are associated with the partial substitution of melamine-formaldehyde resin by urea-formaldehyde resin.

It is also possible to use a mixture of urea-formaldehyde resin with said curing agents and wetting agents as a first synthetic resin. This alternative is the most economical variant.

It is also possible to use a mixture of melamine-formaldehyde resin with said curing agents and wetting agents as a first synthetic resin, with the result that a high degree of crosslinking and high resistance can advantageously be achieved in the finish film 7/9.

A ninth alternative consists in using a mixture of melamine-formaldehyde resin and urea-formaldehyde resin with said curing agents and wetting agents as a first synthetic resin. The use of this synthetic resin is an optimization solution with regard to the properties—low production cost/high degree of crosslinking and high resistance—of the end product which are described as being advantageous in each case for the two preceding alternatives.

The second synthetic resin used in the second application stage AII is, according to the invention, likewise an amino resin, in particular a methylated melamine-formaldehyde oligomer present in liquid form. The synthetic resin mixture present in coating form may furthermore contain, in particular, 2-butoxyethanol and only very small proportions (<1% by mass) of free formaldehyde. In the final finish film 7/9, such a coating system advantageously results in a high resistance to chemicals, good adhesion on the other layers and a low formaldehyde emission. During the processing, the system is distinguished by good leveling on the surface to be coated.

Regarding the method according to the invention, it should be noted in general that, in all application stages AI, AII, AIII, AIV, a respective viscosity, in particular a viscosity required or optimum for the impregnation and/or application, of the first, second, third and/or fourth synthetic resin can be advantageously established by admixing water.

The particulate abrasion-reducing material used in the second application stage AII may preferably be corundum, silica and/or silicon carbide.

This material can be used in particular with a particle size distribution F 220 according to the FEPA (Fédération Européen des Fabricants de Produits Abrasifs) standard for abrasive grades. The mean value of the particle size in the case of this particle size distribution is in the region of about 59 μm. However, it can also be possible to use the grades F 180, F 230, F 240, F 280, F 320, F 360 and F 400 according to the FEPA standard or comparable grades subject to other standards (JIS R 6001, ANSI) or to form a bimodal particle size distribution curve by mixing two of these grades, in order to achieve a higher packing density of the particles.

The proportion of the particulate abrasion-reducing material and/or the amount applied in the layer $4_{wet}$ can advantageously be adjusted as a function of an abrasion resistance (table 1) of the film 7, 9 to be achieved. The higher the abrasion resistance to be achieved, the greater must be the chosen proportion of the particulate abrasion-reducing material and/or the chosen amount applied in the layer $4_{wet}$. This proportion of particulate abrasion-reducing material may be—based on 100 parts by mass of the second synthetic resin or synthetic resin mixture—in the range from 15 to 80 parts by mass, particularly in the range from 30 to 60 parts by mass.

The abovementioned hard particulate material—corundum, silica, silicon carbide—it is also possible to carry out complete or partial substitution by glass beads, whose proportions and mean diameters may be in the same ranges as those of the substituted ureas. The production cost is reduced thereby because the glass beads are a more economical material, i.e. can be produced even with less technological effort. In addition, the glass beads can act as dulling material.

In the second application stage AII, which—as already mentioned—can also be designated as topcoat, the application of the layer $4_{wet}$ can be effected by means of a nozzle on the top of the moist impregnate $3_{wet}$, the amount applied—preferably being in the range from 20 to 100 g/m²—being regulated with the aid of metering rollers. The apparatus described at the outset and known by the name ARP nozzle can advantageously be used here.

For promoting the crosslinking, a curing agent, in particular a curing agent based on organic acids, can be mixed with the synthetic resin used in the second application stage AII, once again before the application. For this acid curing (AC) intended according to the invention, for example, a mixture of p-toluenesulfonic acid, which may contain sulfuric acid in a proportion of not more than 5%, 2-butoxyethanol and ammonia solution may be used.

A curing agent based on paratoluenesulfonic acid may also be, for example, a colorless liquid miscible with water and N-octanol having a boiling point of 100° C., which contains paratoluenesulfonic acid in the range from 35 to 65 percent and, at 20° C., has a density in the range from 1.05 to 1.25 g/cm³ and a viscosity in the range from 8 to 28 s (measured according to DIN EN ISO 2431 using a 4 mm DIN efflux cup) and a pH of 1.

Instead of or together with the more economical acid-curing amino resin coating system as a film topcoat, it is also possible, according to the invention, to use an isocyanate-crosslinking coating system. Depending on the level of the substituting proportion, a comparatively higher abrasion resistance, an even more greatly reduced formaldehyde emission, improved resistance to chemicals and increased film flexibility is achieved thereby. Moreover, substantially better and solvent-free cleaning of the coating unit is possible.

Isocyanate-crosslinking coating systems are two-component systems which consist of a basecoat or primer, for example an acrylic resin containing hydroxyl groups or a polydiol, such as 2,2'-(etherdioxy)diethanol, or a methylolated or etherified melamine resin or a mixture of these substances and a curing agent solution. For example, a mixture which comprises 80 percent of an aliphatic polyisocyanate and 20 percent of propylene carbonate can advantageously be used as such a curing agent solution.

As already been mentioned, when the coating systems are mixed, a three-component primer is present as a layer-forming material, which is cured by two curing mechanisms and with two types of curing agents.

The respective proportions of the curing agents may be—based on 100 parts by mass of the second synthetic resin—in the range from 1 to 40 parts by mass, preferably in the range from 2 to 10 parts by mass, even smaller proportions being sufficient for complete crosslinking in the case of isocyanate curing than in the case of acid curing.

The heat treatment is then effected in the third method stage, which constitutes the first treatment stage BI. Said heat treatment serves for partial curing of the synthetic resins (first and second synthetic resin) and for partial removal of the moisture from the moist coated impregnate $5_{wet}$. For the purposes of a gentle treatment but efficient and precise procedure a continuously operating convection belt dryer, in particular a lay-on-air dryer with time, temperature and air circulation control, can be used.

By using the curing agents described above, the necessary treatment time in the dryer is shortened. At a temperature in the range from 80° C. to 180° C., in particular in the range from 100° C. to 140° C., it may be less than two minutes, preferably less than one minute. The belt speed or throughput speed through the dryer can be adjusted to be correspondingly high, taking into account the length of the drying zone.

The third synthetic resin used in the third application stage AIII may advantageously be an amino resin similar to that in the second application stage AII, i.e. in particular a methylated melamine-formaldehyde oligomer present in liquid form and/or an isocyanate-crosslinking coating system. This can, however, be modified for achieving a particular surface quality, in particular a desired gloss. With regard to its composition and its proportion, a curing agent too can be used in analogy to the second application stage AII.

In the third application stage AIII, a wetting agent which also promotes the leveling of the resin on the surface to be coated can preferably also be added to the synthetic resin. The wetting agent acts in particular both on the surface quality and on the surface tension. Dipropylene glycol methyl ether, which can also reduce the pore formation, can advantageously be used as such a wetting agent for the synthetic resin described. The corresponding amount may be—based on the synthetic resin—up to about 1% by mass, but may also be less than 0.5% by mass and in particular from 0.1 to 0.2% by mass.

In the third application stage AIII, which—as shown in FIG. 1 and already mentioned—can also be designated as coating application for short, the layer $6_{wet}$ of the synthetic resin can be effected by means of an engraved roller onto the surface of the predried particle-containing layer 4, the amount applied, which may be in the range from 2 to 50 g/m², in particular in the range from 15 to 35 g/m², being established by a well size, by a running speed of the engraved roller and/or by the solids content of the synthetic resin. In this context, it should also be noted that the stated grammages of the layers are based in each case on the dry state, it being assumed that, in this dry state, from 2 to 4% of a residue of moisture may still be present.

As an alternative to the engraved roller, other application methods customary in coating technology, such as roller mill application units, smooth roller application units or Meyer bar coating systems and so-called pressure-chamber doctor systems, can also be used.

If desired, so-called undercoating can be effected in a fifth method stage, which is designated in FIG. 1 as application stage IV. Here too, the layer $8_{wet}$ of the fifth synthetic resin can be effected by means of an engraved roller, but on the predried underside 2 of the coated and lacquered impregnate $7_{wet}$, it being possible once again for the amount applied—preferably with a grammage in the range from 1 to 20 g/m²—to be adjusted by the well size, by the running speed of the engraved roller and by the solids content of the synthetic resin. A polymer dispersion as described for the first application stage as a constituent of the synthetic resin mixture, preferably in an aqueous, anionic polymer dispersion of an acrylate-containing copolymer, can advantageously be used as fifth synthetic resin. A wetting agent can also be mixed with the fourth synthetic resin. The adhesiveness increased by the undercoat in the lower layer 8 of the finish film 9 compared with the impregnating layer 2 helps to bring about better adhesive bondability of an applied adhesive during subsequent further processing of the finish film 9.

Once again—as in the first treatment stage BI—a continuously operating convection belt dryer with time, temperature and air circulation control can be used for the heat treatment following the fourth or following the fifth method stage in the second treatment stage BII. It is possible thereby to ensure that a treatment time in the second treatment stage BII at a temperature in the range from 90° C. to 205° C., in particular in the range from 140° C. to 195° C., is less than 60, preferably less than 30, seconds. This further heat treatment leads to the complete curing of all synthetic resins used and removal of the moisture.

The final film or finish film 7, 9 can finally also be rolled up in the manufacturing line and can be transported and delivered in this roll form.

As is already evident from the above statements, the present invention is not limited to the working example described but comprises all means and measures having the same effect in the context of the invention. Thus, for example, it is also within the scope of the invention if the respective treatment product after the first treatment stage BI and/or the second treatment stage BII is cooled following the heat treatment.

The term "decorative paper" for the decorative paper 1 used in the first application stage AI is to be interpreted widely with regard to its possible grammage. Thus, this may be in the range from 15 to 140 g/m$^2$, and the method according to the invention also appears to be suitable in principle for specific basis weights differing from this value. From this point of view, it should be mentioned in connection with the resin application during the impregnation that the specific basis weights of the applied synthetic resin in the abovementioned range, based on said initial grammage of the decorative paper 1, should preferably be about 50 to 70%.

As an alternative to the procedure described, a so-called preimpregnate can be used, in which case the first application stage AI (impregnation) is completely omitted.

In the method according to the invention, it is possible—as is also evident from FIG. 1—to realize the fourth method stage AIII and the fifth method stage AIV simultaneously or with a slight time difference in a single equipment unit, such as a middle impregnating unit. The engraved rollers serving as application elements can be arranged therein in each case as upper and as lower engraved roller, according to their function.

Furthermore, the invention is not limited to the combinations of features defined in the independent claims but may also be defined by any other arbitrary combination with certain features all individual features disclosed altogether. This means that in principle virtually any individual feature of the independent claims can be omitted or can be replaced by at least one individual feature disclosed elsewhere in the application. To this extent, the claims are to be understood merely as a first attempt at formulating an invention.

The invention claimed is:

1. A method for the production of an abrasion-resistant film, in particular for the production of laminate floor materials and abrasion-resistant furniture surfaces, comprising the following method stages:
   impregnating a decorative paper with an impregnation containing a first synthetic resin to form a moist impregnate;
   applying a wet particle-containing layer, which contains a second synthetic resin and a particulate abrasion-reducing material, to the moist impregnate to form a moist coated impregnate, wherein the second synthetic resin comprises a mixture of an acid-curing amino-formaldehyde resin and an isocyanate-crosslinking coating system;
   providing a first heat treatment to the moist coated impregnate whereby the first and second synthetic resins are partially cured to respectively form a predried impregnation and a predried particulate layer, wherein both the predried impregnation and the predried particulate layer form a heat treated product;
   applying a wet cover layer containing a third synthetic resin to the heat treated product to form an undried film; and
   providing a second heat treatment to the undried film whereby the first, second, and third synthetic resins are totally cured, and whereby an undried film is produced.

2. The method as claimed in claim 1, wherein the first synthetic resin contains an amino resin in liquid form, wherein the amino resin comprises at least one of a urea-formaldehyde oligomer and a melamine-formaldehyde oligomer.

3. The method as claimed in claim 1, wherein impregnating the decorative paper comprises mixing a polymer dispersion with the first synthetic resin, wherein the polymer dispersion comprises at least one of an acrylate homopolymer, a methacrylate homopolymer, a vinyl acetate homopolymer, a styrene-acrylate copolymer, a styrene-methacrylate copolymer, and a polybutadiene-styrene copolymer, and further wherein impregnating the decorative paper further comprises providing from 5 to 120 parts by mass of the polymer dispersion based on 100 parts by mass of the first synthetic resin.

4. The method as claimed in claim 1, wherein the first synthetic resin contains a crosslinking component comprising at least one of:
   a mixture of a modified polycarboxylic acid and a polyhydric alcohol; and
   an aqueous styrene-acrylate dispersion, wherein the dispersion is modified with a polycarboxylic acid and a polyhydric alcohol.

5. The method as claimed in claim 1, further comprising mixing a curing agent with the first synthetic resin to promote crosslinking, wherein the curing agent comprises at least one of ammonium chloride, magnesium chloride, paratoluenesulfonic acid, and chloride-free curing agent having a pH range of from 6.8 to 7.4 based on an aqueous solution of inorganic salts.

6. The method as claimed in claim 1, further comprising mixing an impregnating agent with the first synthetic resin, wherein the impregnating agent is an anionic surfactant comprising at least one of a diethylene glycol and a fatty alcohol glycol ether.

7. The method as claimed in claim 6, wherein the proportion of the impregnating agent—based on the solids content of the first synthetic resin or of the synthetic resin mixture—is in the range of from about 0.1% by mass to 0.6% by mass.

8. The method as claimed in claim 1, further comprising admixing water with at least one of the first, second, and third synthetic resins to obtain a viscosity which is optimum for impregnating the decorative paper, and which is optimum for applying the second and third synthetic resin onto the respective moist impregnate and heat-treated product.

9. The method as claimed in claim 1, wherein impregnating the decorative paper with the impregnation comprises saturating the decorative paper with the impregnation, wherein saturating comprises:
   washing the impregnation onto a back side of the decorative paper;
   allowing the impregnation to penetrate into the decorative paper; and
   loading an immersion zone of the decorative paper with the impregnation.

10. The method as claimed in claim 9, wherein impregnating the decorative paper further comprises regulating the amount of the impregnation loaded onto the decorative paper with metering rollers.

11. The method as claimed in claim 1, wherein at least one of the second synthetic resin and the third synthetic resin contains a methylated melamine-formaldehyde oligomer present in liquid form.

12. The method as claimed in claim 1, wherein at least one of the second synthetic resin and the third synthetic resin contains an acrylic resin present in liquid form, wherein the acrylic resin comprises at least one of a hydroxyl group, a polydiol, a methylolated melamine resin, and an etherified melamine resin.

13. The method as claimed in claim 1, wherein the particulate abrasion-reducing material comprises at least one of corundum, silica, silicon carbide, and glass beads, wherein the particulate abrasion-reducing material comprises a particle size distribution of F 220 according to FEPA.

14. The method as claimed in claim 1, wherein applying the wet particle-containing layer to a surface of the moist impregnate comprises using a nozzle, and further comprises regulating an amount of the wet particle-containing, layer which is applied to the surface of the moist impregnate by means of metering rollers.

15. The method as claimed in claim 1 further comprising adjusting at least one of:
   a proportion of the particulate abrasion-reducing material contained in the wet particle-containing layer; and
   an amount of the wet particle-containing layer that is applied to the moist impregnate;
   wherein adjusting is done as a function of an abrasion resistance of the abrasion-resistant film which is to be achieved.

16. The method as claimed in claim 1, wherein a proportion of the particulate abrasion-reducing material—based on 100 parts by mass of the second synthetic resin—is in the range of from 15 to 80 parts by mass.

17. The method as claimed in claim 1, wherein the amount of the wet particle-containing layer that is applied to the moist impregnate is in the range of from 20 to 100 $g/m^2$.

18. The method as claimed in claim 1, further comprising mixing a curing agent with at least one of the second synthetic resin and the third synthetic resin to promote cross-linking, wherein the curing agent comprises, at least one of an organic acid and an isocyanate.

19. The method as claimed in claim 18, wherein the proportion of the curing agent, based on 100 parts by mass of the respective second synthetic resin and third synthetic resin, is in the range of from 1 to 40 parts by mass.

20. The method as claimed in claim 1, wherein providing the first heat treatment and the second heat treatment comprises respectively heating the moist coated impregnate and the undried film with a continuously operating convection belt dryer.

21. The method as claimed in claim 1, wherein providing the first heat treatment comprises heating the moist coated impregnate at a temperature in the range of from 80° C. to 180° C. for less than two minutes.

22. The method as claimed in claim 1, further comprising mixing a wetting agent comprising dipropylene glycol methyl ether with the third synthetic resin prior to applying the wet cover layer to the heat treated product.

23. The method as claimed in claim 22, wherein a proportion of the wetting agent in the wet cover layer—based on the amount of the third synthetic resin in the wet cover layer—is less than 1.0% by mass.

24. The method as claimed in claim 1, wherein applying the wet cover layer to the heat treated product comprises applying the wet cover layer to a surface of the predried particulate layer by means of an engraved roller, wherein the engraved roller is selected from the group consisting of an upper engraved roller arranged in a middle impregnating unit, roll mill unit, a smooth roller application unit, a Meyer bar, and a pressure-chamber doctor system.

25. The method as claimed in claim 1, further comprising applying a lower layer to an underside of the predried impregnation, wherein the lower layer comprises a fourth synthetic resin having a grammage in the range of from 1 to 20 $g/m^2$, and wherein the lower layer is applied by means of an engraved roller.

26. The method as claimed in claim 24 or 25, wherein the amount of the third synthetic resin and the fourth synthetic resin applied by the respective engraved roller is established by at least one of a well size, a running speed of the engraved roller, and by the solids content of the respective third synthetic resin and fourth synthetic resin.

27. The method as claimed in claim 1, wherein applying the wet cover layer comprises providing the third synthetic resin in a range of from 2 to 50 $g/m^2$.

28. The method as claimed in claim 25, wherein the fourth synthetic resin comprises a polymer dispersion comprising at least one of an acrylate homopolymer, a methacrylate homopolymer, a vinyl acetate homopolymer, a styrene-acrylate copolymer, a styrene-methacrylate copolymer, and a polybutadiene-styrene copolymer(s).

29. The method as claimed in claim 25, further comprising mixing a curing agent with the fourth synthetic resin to promote crosslinking, wherein the curing agent comprises at least one of ammonium chloride, magnesium chloride, para-toluenesulfonic acid, and a chloride-free curing agent based on an aqueous solution of inorganic salts in the neutral pH range.

30. The method as claimed in claim 1, wherein the second heat treatment comprises heating the undried film at a temperature in the range of from 90° C. to 205° C. for less than 30 seconds.

* * * * *